United States Patent [19]
Guadagnini et al.

[11] 3,783,159

[45] Jan. 1, 1974

[54] PHARMACEUTICAL COMPOSITIONS CONTAINING KANAMYCIN EMBONATE

[75] Inventors: Giuseppe Guadagnini, Sannazzaro dei Burgondi; Franco Fabi, Milan, both of Italy

[73] Assignee: Pierrel S.p.A., Milano, Italy

[22] Filed: Mar. 23, 1972

[21] Appl. No.: 237,575

Related U.S. Application Data

[62] Division of Ser. No. 62,147, Aug. 7, 1970, Pat. No. 3,691,151.

[52] U.S. Cl. .................................................. 424/181
[51] Int. Cl. ............................................ A61k 21/00
[58] Field of Search ..................................... 424/181

[56] References Cited
OTHER PUBLICATIONS

The Merck Index, 8th Edition, 1968, Merck & Co., Inc. Rahway, N.J., pages 597 and 598.

*Primary Examiner*—Jerome D. Goldberg
*Attorney*—Bacon & Thomas

[57] ABSTRACT

The present invention relates to an a bacteriostatic pharmaceutical composition containing kanamycin embonate.

4 Claims, No Drawings

PHARMACEUTICAL COMPOSITIONS CONTAINING KANAMYCIN EMBONATE

This is a division of application Ser. No. 62,147, filed Aug. 7, 1970, issued as U.S. Pat. No. 3,691,151 on Sept. 12, 1972.

The present invention relates to a new insoluble salt of kanamycin, kanamycin embonate, and to a method of preparing the salt.

Kanamycin is a known water soluble basic antibiotic produced by *Streptomyces kanamiceticus* according to the procedure set forth by H. Umezawa et al. in the "Journal of Antibiotics," Series A, 10, 181 (1957). It has been shown by S. Umezawa et al "Journal of Antibiotics," Series A, 11, 120–121 (1958) to have the following formula:

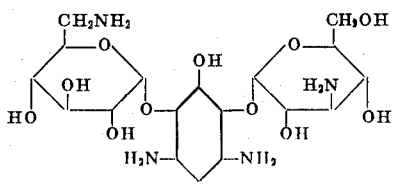

Kanamycin can be seen from the above formula to have four free amino groups per molecule and it may form acid addition salts with many acids. Kanamycin is ordinarily recovered from its fermentation broths and produced commercially in the form of its monosulphate.

Kanamycin embonate, is a bacteriostatic substance, which has similar antibiotic properties to kanamycin, being effective against both Gram positive and Gram negative bacteria.

Kanamycin embonate is also less toxic and less water soluble than kanamycin itself and furthermore it is particularly effective in the treatment of intestinal diseases.

An important requirement for a product to be therapeutically active in the treatment of intestinal diseases, particularly of diarrheic ones, is that it should be possible to maintain a high concentration of active substance in contact with the affected part, substantially without absorption of the compound. It is also important that the pharmaceutical composition containing the active compound should have a high adsorbing power. A higher adsorbing power is usually obtained, or produced, in known compositions by adding to the active compounds a substance of a high adsorbing ability, as for instance vegetable charcoal or Kaolin which themselves are therapeutically inactive.

Kanamycin embonate has useful properties and in comparison with other known salts of kanamycin, for example kanamycin sulphate, it has several advantages. Firstly, as kanamycin embonate is less soluble in water it is consequently less readily absorbed which enables a high concentration of the active compound to be maintained in contact with the affected surface for a longer period of time. The salt also possesses a high adsorbing power, superior in fact to that of vegetable charcoal as shown when the two substances are compared using methylene blue solutions buffered to pH 7.4. The absorbing power of kanamycin embonate with regard to bacterial cultures is also superior to that of kaolin as shown in the following test: Two bacterial cultures, the first one of Salmonella tiphimurium which is sensitive to kanamycin, and the second one of Aerobacter aerogenes which is resistant to kanamycin, are incubated for 18 hours and then kanamycin embonate and kaolin respectively are added in amounts of 20 mg./ml. each. The two resulting suspensions are shook for 30', left to stand for 3 hours and finally aliquots of the supernatants are collected and diluted with physiologic soltuion.

The bacterial counts have been carried out by means of two techniques for each case showing the results reported in the table here below. With the first technique, the diluted solution has been used for inoculating Petri dishes containing trypticase-soy-agar and the number of viable bacterial cells calculated. With the second technique, the total number of bacterial cells (viable and dead) has been calculated using a "Burker" apparatus.

|  | Petri dishes | | | Burker | | |
|---|---|---|---|---|---|---|
|  | Initial bacterial count | Bac. ct. after treatment | Difs. of bac. count in percent | Intial bacterial count | Bac. ct. after treatment | Difs. of bac. count in percent |
| *Kanamycin embonate:* | | | | | | |
| 1st test: *S. tiphimurium* | 2.3×10⁹ | 2.1×10⁷ | 99 | 3×10⁹ | 2.95×10⁷ | 99 |
| 2nd test: *A. aerogenes* | 6×10⁹ | 1.2×10⁹ | 80 | 6.6×10⁹ | 1×10⁹ | 85 |
| *Kaolin:* | | | | | | |
| 1st test: *S. tiphimurium* | 2.3×10⁹ | 5×10⁸ | 78.4 | 3×10⁹ | 7.2×10⁸ | 76 |
| 2nd test: *A. aerogenes* | 6×10⁹ | 1.5×10⁹ | 75 | 6.6×10⁹ | 2.2×10⁹ | 66.6 |

The adsorbing properties of the new salts are combined with the antibiotic characteristics of kanamycin, and it is therefore possible to prepare pharmaceutical compositions that possess the necessary requirements for effective treatment of intestinal infections, without the necessity to add any other substance to the kanamycin embonate.

Kanamycin embonate can easily be prepared by any of the processes suitable for the preparation of salts.

In the process according to the invention a solution of a soluble salt of embonic acid, preferably the sodium or potassium salts, is reacted at room temperature with a solution of a soluble salt of kanamycin, preferably a sulphate.

The molecular ratio between the kanamycin and the embonic acid in the reaction medium should be 1:2 or more than 2. The kanamycin embonate precipitates and is separated by filtration and washed with water to remove the sulphate ions. The kanamycin embonate has the following characteristics:

Molecular weight: 1261.60
Contents: embonic acid 61.6%
kanamycin base 38.4%

Structural formula:

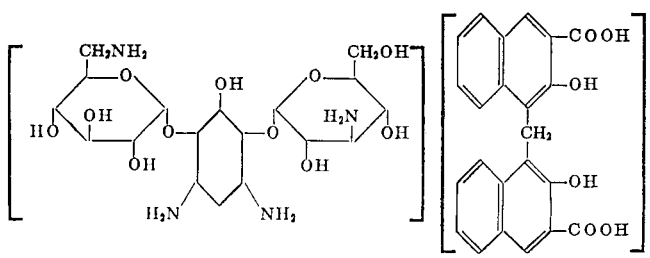

Physicochemical characteristics:
Microcrystalline yellow powder -
Melting point (with decomposition): about 225°C
Practically insoluble in:
water, acetone, benzene, chlorform, diethylamine, isopropylalcohol,
methylene chloride, pyridine, carbon tetrachloride
Sparingly soluble in:
methyl and ethyl alcohols.
Soluble in:
Dimethylsulphoxyde, dimethylformamide, alkalies.
Antibiotic spectrum:
The antibiotic of spectrum of kanamycin embonate does not substantially differ from that of kanamycin sulphate. In the following table we are reporting the data relative to the minimum inhibiting concentration of the two salts in comparison with various bacterial and fungal species. The minimum inhibiting concentration is given in $\gamma$/ml. and it is expressed as activity referred to kanamycin base for both salts.

| TEST GERMS | Kanamycin Sulphate (m.i.c. in $\gamma$/ml.) | Kanamycin Embonate (m.e.c. in $\gamma$/ml.) |
|---|---|---|
| S. Aureus ATCC 65388 | 8 | 11 |
| B. cereus var. mycoides ATCC 11778 | 12 | 12 |
| S. cerevisiae 9763 | 120 | 120 |
| E. coli ATCC 113/3 (ATCC 11105) | 20 | 20 |
| S. haemoliticus 9854 | 110 | 65 |
| S. typhimurium ex CIIVP 478 | 4 | 4 |
| S. flavus ATCC 10240 | 10 | 12 |
| B. megatherium ATCC 10778 | 0.3 | 0.25 |
| B. subtilis ATCC 6633 | 2 | 1.5 |
| S. lutes ATCC 9341 | 8 | 6 |
| S. sonnei ATCC 9290 | 24 | 24 |
| P. multocida ATCC 12948 | 24 | 24 |
| C. albicans ATCC 10231 | 120 | 120 |
| Salm. paratiphi - A | 4 | 4 |
| Salm. paratiphi - B | 8 | 8 |
| Shigella dysenteriae | 5 | 5 |
| Shigella flexneri | 10 | 10 |

$LD_{50}$:
The $LD_{50}$ of kanamycin embonate, orally administered (Sprague Dawley) is higher than 5000 mg/Kg. expressed as mg. of base per Kg. of live weight.

ACUTE TOXICITY

The acute toxicity was investigated in the mouse and rat by administering orally kanamycin embonate also at the maximum dose level of 5 mg./Kg. b.w. (body weight) per day (activity expressed as kanamycin base). No death occurred in 7 days of treatment.

SUB-ACUTE TOXIDITY

The sub-acute toxicity was investigated in adult Albino rats of both sexes. Kanamycin embonate was administered orally at two dose levels: 150 and 400 mg./Kg. b.w. per day (activity expressed as kanamycin base), for 55 days.
The treatment produced a light decrease in growth rate and weight gains both in male and female animals, but the following parameters were not affected: liver function (bromosulphaphthalein test), kidney function, e.k.c., emopoietic system, bone marrow formation, blood N, blood glucose, serum proteins and gross histological examination.

CHRONIC TOXICITY

A chronic treatment was investigated in Albino rats of both sexes by administering orally kanamycin embonate at two dose levels: 50 and 100 mg./Kg. b.w. per day (activity expressed as kanamycin base) for 180 days.
The treatment did not affect the following parameters: growth rate, blood N, blood glucose, emopoietic system, bone marrow formation, liver function, kidney function, e.k.c., weight gain and gross histological examination.
A chronic treatment was investigated in adult dogs by administering orally kanamycin embonate at two dose levels: 83 and 166 mg./Kg. b.w. per day (activity expressed as kanamycin base), for 180 days. The treatment did not affect the following parameters: weight gain, blood N, blood glucose, emopoietic system, bone marrow formation, kidney function, serum glutamic oxalacetic transaminase, serum glutamic piruvic transaminase, serum alkaline phosphatase, and gross histological examination of the main organs.

EMBRYOTOXICITY

The embryotoxicity was investigated in rats and rabbits by administering orally kanamycin embonate at the maximum dose of 166 mg./Kg. b.w. per day (activity expressed as kanamycin base) from the 3rd to the 17th day of pregnancy inclusive.
The treatment did not affect the gestation and showed no noxious effect on the pregnant animals and on the embryo-fetal development.

OTOTOXICITY

The ototoxicity was investigated by administering orally kanamycin embonate in Guinea pigs at the dose of 100 mg./Kg. b.w. (activity expressed as kanamycin base).
The treatment produced no significative modification of the cochliovestibular function and of the histological structure of the interior ear.

ABSORPTION

Kanamycin embonate adminstered orally is slightly absorbed by the gastroenteric walls and it can be absorbed only at very high dosage levels, however its absorption is always inferior than the absorption of equal dosage of kanamycin sulphate.

EXAMPLE OF PREPARATION

A solution of 86.6 g. (0.2 moles) of sodium embonate in 2 l. of water is slowly added under stirring at room temperature, to a solution of 67.8 g. (0.1 mole) of kanamycin disulphate dissolved in 2 l. of water. A light yellow precipitate is formed, which is then filtered, washed with water and dried under vacuum. 112 g. of kanamycin embonate, having the above reported characteristics and having an activity of kanamycin: 330–380 U/mg. are obtained.

PHARMACEUTICAL COMPOSITIONS

Kanamycin embonate is used for preparing pharmaceutical compositions for human as well as veterinary use, which are administered orally in any of the following suitable forms tablets - coated tablets - capsules - suspensions - syrups - drops.

The pharmaceutical compositions in solid forms — tablets, coated tablets, capsules, drapsules — contain from 50 mg. to 500 mg. of kanamycin embonate per each dosage unit, depending from the particular formulation, together with suitable excipients and carriers. The pharmaceutical compositions in liquid forms — suspensions, syrups, drops - contain from 5.0 g. of kanamycin embonate per 100 ml. depending from the particular formulation, together with suitable sweetening, flavouring, thickening or dispersing agents. For veterinary purposes, kanamycin embonate is administered orally in form of extemporary suspension or tablets at dosages depending from the kind of animals to be treated.

We claim:

1. A pharmaceutical composition comprising an effective bacteriostatic, non-toxic amount of kanamycin embonate in combination with a pharmaceutically acceptable excipient or carrier.

2. The composition of claim 1 in solid dosage form in which the amount of kanamycin embonate is from about 50 to 500 mg. per dosage unit.

3. The composition of claim 1 in liquid form in which the amount of kanamycin embonate is from about 0.5 g. to 5 g. per 100 ml of liquid.

4. The composition of claim 1 in tablet, capsule, suspension, syrup or drop form.

* * * * *

UNITED STATES PATENT OFFICE
CERTIFICATE OF CORRECTION

Patent No. 3,783,159  Dated  January 1, 1974

Inventor(s)  Giuseppe Guadagnini and Franco Fabi

It is certified that error appears in the above-identified patent and that said Letters Patent are hereby corrected as shown below:

IN THE SPECIFICATION:

Correct the formula top of column 3, as follows:

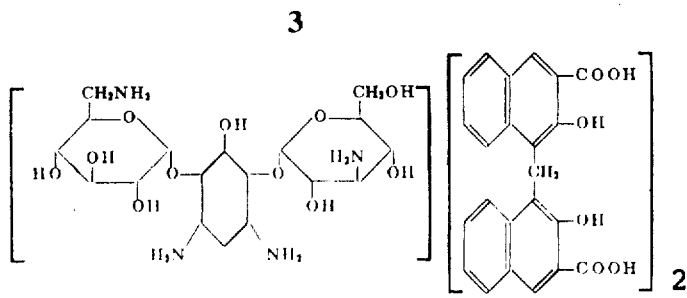

Signed and Sealed this fifth Day of August 1975

[SEAL]

Attest:

RUTH C. MASON
Attesting Officer

C. MARSHALL DANN
Commissioner of Patents and Trademarks